(12) United States Patent
Miyazaki (10) Patent No.: US 8,085,632 B2
(45) Date of Patent: Dec. 27, 2011

(54) RECORDING APPARATUS (75) Inventor: Yoshio Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/834,590

(22) Filed: Jul. 12, 2010

(65) Prior Publication Data

US 2010/0271920 A1 Oct. 28, 2010

Related U.S. Application Data (63) Continuation of application No. 11/734,609, filed on Apr. 12, 2007, which is a continuation of application No. 09/692,601, filed on Oct. 19, 2000, now Pat. No. 7,307,934.

(30) Foreign Application Priority Data

Oct. 20, 1999 (JP) .................................. P11-297937
Feb. 15, 2000 (JP) ............................... P2000-036807

(51) Int. Cl.
G11B 7/00 (2006.01)

(52) U.S. Cl. ...................................... 369/47.12; 369/85

(58) Field of Classification Search ................ 369/53.31, 369/30.05, 47.12, 84; 705/14.64; 700/234; 709/219
See application file for complete search history.

(56) References Cited

U.S. PATENT DOCUMENTS

| 4,931,927 A | 6/1990 | Ishiwata et al. |
| 5,581,740 A | 12/1996 | Jones |
| 5,633,839 A | 5/1997 | Alexander et al. |
| 5,729,516 A | 3/1998 | Tozaki et al. |
| 5,778,257 A | 7/1998 | Tsukatani et al. |
| 5,848,398 A | 12/1998 | Martin et al. |
| 5,943,311 A | 8/1999 | Takenaka |
| 6,011,761 A | 1/2000 | Inoue |
| 6,075,920 A | 6/2000 | Kawamura et al. |
| 6,212,555 B1 | 4/2001 | Brooks et al. |
| 6,249,817 B1 | 6/2001 | Nakabayashi et al. |
| 6,335,910 B1 | 1/2002 | Yoshizawa et al. |
| 6,388,766 B1 | 5/2002 | Inoue et al. |

(Continued)

FOREIGN PATENT DOCUMENTS

EP 0786774 7/1997

(Continued)

OTHER PUBLICATIONS

U.S. Appl. No. 12/834,562, filed Jul. 12, 2010, Miyazaki.

(Continued)

Primary Examiner — Peter Vincent Agustin
(74) Attorney, Agent, or Firm — Oblon, Spivak, McClelland, Maier & Neustadt, L.L.P.

(57) ABSTRACT

A recording apparatus having a reproduction means to play digital data from a recording medium recorded with that digital data and retrieval information, a recording means to write the digital data reproduced by the reproduction means and record the retrieval information on a control table, and a control circuit to search the control table by using the retrieval information when the digital data from the reproduction means is written by the recording means, to permit the writing of digital data recorded on the medium with the recording means when the retrieval information is not recorded on the control table, and to prohibit the writing of digital data recorded on the medium with the recording means when the retrieval information is already recorded on the control table, and also prevent the mistaken duplicate copying of the digital data with the recording means.

22 Claims, 5 Drawing Sheets

U.S. PATENT DOCUMENTS

| | | |
|---|---|---|
| 6,408,332 B1 * | 6/2002 | Matsumoto et al. .......... 709/219 |
| 6,452,885 B1 | 9/2002 | Yeo |
| 6,567,358 B1 | 5/2003 | Komma et al. |
| 6,571,235 B1 | 5/2003 | Marpe et al. |
| 6,618,335 B2 | 9/2003 | Tanaka et al. |
| 6,661,430 B1 | 12/2003 | Brewer et al. |
| 6,668,158 B1 | 12/2003 | Tsutsui et al. |
| 6,675,148 B2 | 1/2004 | Hardwick |
| 6,678,464 B1 | 1/2004 | Kawai et al. |
| 6,834,348 B1 | 12/2004 | Tagawa et al. |
| 6,836,844 B1 | 12/2004 | Kori et al. |
| 7,307,934 B1 | 12/2007 | Miyazaki |

FOREIGN PATENT DOCUMENTS

| | | |
|---|---|---|
| JP | 62-229589 | 10/1987 |
| JP | 63-26889 | 2/1988 |
| JP | 3-76082 | 4/1991 |
| JP | 6-68599 | 3/1994 |
| JP | 9-130733 | 5/1997 |
| JP | 10-83297 | 3/1998 |
| JP | 10-162508 | 6/1998 |
| JP | 11-53818 | 2/1999 |
| JP | 11-234615 | 8/1999 |
| JP | 11-283325 | 10/1999 |
| JP | 2000-200475 | 7/2000 |
| JP | 2001-143369 | 5/2001 |
| JP | 3867807 | 10/2006 |

OTHER PUBLICATIONS

U.S. Appl. No. 12/834,619, filed Jul. 12, 2010, Miyazaki.

* cited by examiner

| TOC DATA | NUMBER OF TRACKS | TRACK 1 | | TRACK 2 | | ... | TRACK 99 | | TITLE |
|---|---|---|---|---|---|---|---|---|---|
| | | START POSITION | END POSITION | START POSITION | END POSITION | | START POSITION | END POSITION | |
| #1 xxxx | xx | xx | xx | xx | xx | | -- | -- | xxxx |
| #2 | | | | | | | | | |
| #3 | | | | | | | | | |
| ... | | | | | | | | | |
| #100 | | | | | | | | | |

RECORDING APPARATUS

CROSS-REFERENCE TO RELATED APPLICATIONS

This application is a continuation application of, and claims priority to, U.S. application Ser. No. 11/734,609, filed Apr. 12, 2007, which was a continuation application of, and claims priority to, U.S. application Ser. No. 09/692,601, filed Oct. 19, 2000, now U.S. Pat. No. 7,307,934, and claims priority to Japanese Application Nos. 11-297937, filed Oct. 20, 1999, and 2000-036807, filed Feb. 15, 2000. The entire contents of each of these documents are incorporated herein by reference.

BACKGROUND OF THE INVENTION

1. Field of the Invention

The present invention relates to a recording apparatus.

2. Description of Related Art

A HDD (hard disk drive) installed in audio device used for instance while mounted in a vehicle and capable of copying the contents of a CD (compact disc) could search for and play a portion of the CD the user wants to hear, faster than a CD changer, etc.

The capacity of a music CD in such cases is approximately 760 megabytes (equal to approximately 44.1 kHz☐~16 bits☐~2 channels☐~60 seconds☐~74 minutes). The digital audio data of the CD can also be compressed to approximately one-tenth the original size by appropriate use of data compression technology.

Therefore, even a CD fully stored with music, can be compressed to approximately 80 megabytes of data, so that if a HDD (hard disk drive) of 8 gigabytes is available, then over 100 CD compact discs can be copied onto that HDD.

In other words, if the contents of a CD can be compressed onto a HDD (hard disk drive) then a much greater quantity of CDs could be handled compared for example to a vehicle mounted CD changer that handles about 10 CDs at one time. Furthermore, the desired CD can also be quickly selected and played back.

However, when 100 compact discs are copied in a system structured in this way, the same CD is sometimes mistakenly copied twice. In order to avoid such trouble, the user has no other choice but to monitor the copied CDs that requires for instance, making a note of the name of the copied CD.

However, managing 100 compact discs is very large task. Consequently, the same CD might still be mistakenly copied twice.

SUMMARY OF THE INVENTION

This invention has the goal of resolving this problem with the related art.

This invention is a recording apparatus having a reproduction means to play for example, digital data and retrieval information for that digital data recorded on a medium, a recording means to record written digital data played by the reproduction means and the retrieval information recorded on a control table, and further having a control circuit to search the control table by using the retrieval information when the digital data from the reproduction means is written by the recording means, and to permit writing of digital data recorded on the medium with the recording means when the results of this search show that the retrieval information is not already recorded on the control table, and to prohibit the writing of digital data recorded on the medium with the recording means, when the results of the search show the retrieval information is already recorded on the control table, consequently, the contents of a recording medium already copied on a recording apparatus are prohibited from being recopied onto the recording apparatus.

DETAILED DESCRIPTION OF THE PREFERRED EMBODIMENTS

Figure 1:
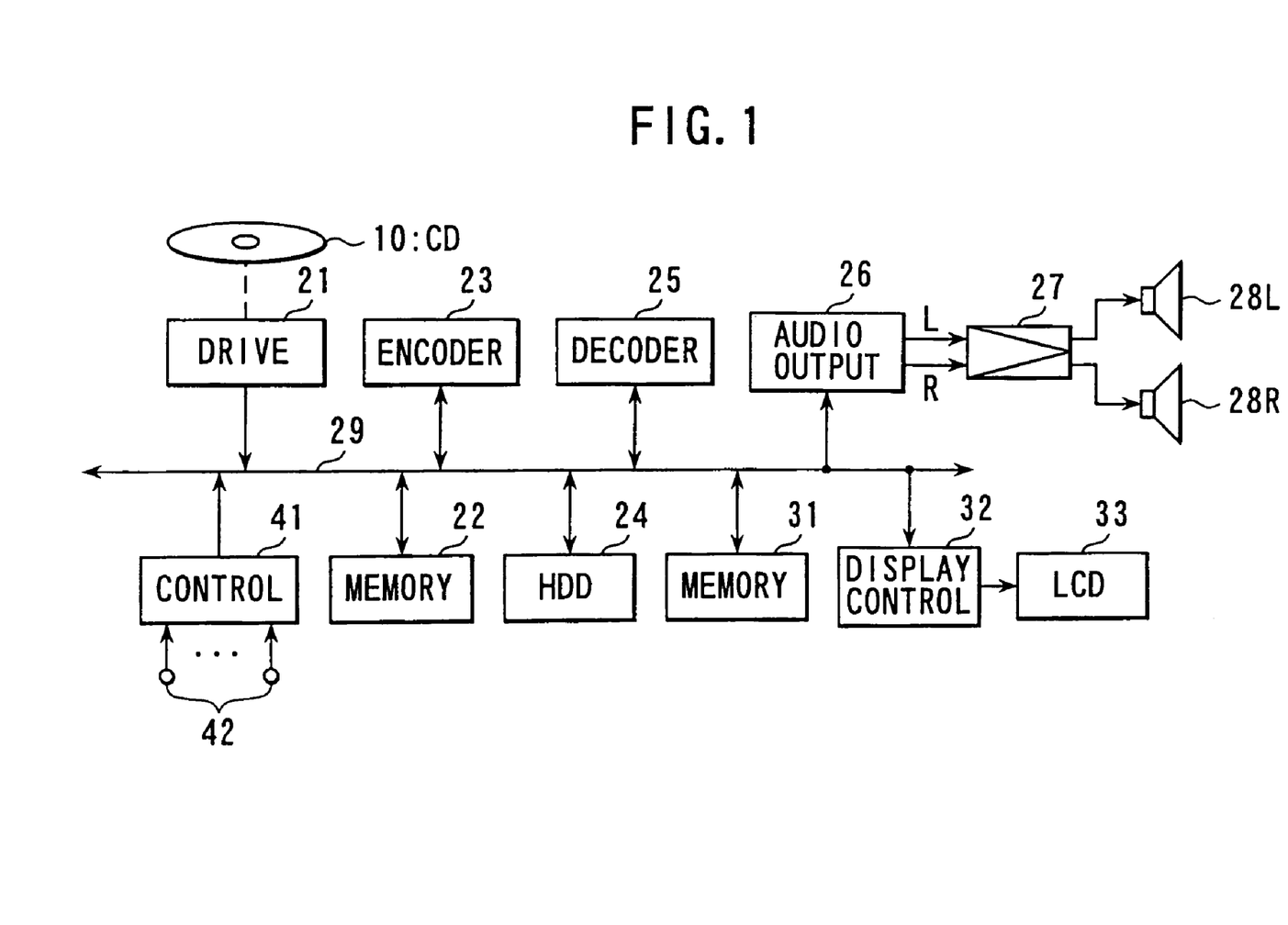
FIG. 1 is a system block diagram of the embodiment of the invention.

A typical view of the apparatus of this invention centering mainly on the audio signal line is shown in FIG. 1.

The reference numeral 10 denotes a CD (compact disc) recorded for example with digital audio data for music. When the CD 10 is a compact disc conforming to "CD text" standards, the incidental text (character) information of the CD 10, such as data recorded with the title and performer of CD 10 for example, is recorded in the R through W channels contained in the tracks of the CD 10 lead-in area.

The CD 10 is reproduced by the reproduction means constituted by the CD drive device 21. Digital audio data for reproduction processing such as demodulation and error correction is extracted from this CD drive device 21, and this digital audio data is supplied to a bus line 29.

A buffer memory 22 as well as a data compression encoder circuit 23 are connected to the bus line 29. The encoder circuit 23 is comprised for instance by a DSP, and compresses the digital audio data reproduced from the CD 10 to about one-tenth the original size by ATRAC (Adaptive Transform Acoustic Coding) processing (ATRAC is a registered commercial trademark).

A HDD 24 for instance is connected as a large capacity recording means to the bus line 29. This HDD 24 is for accumulating the digital audio data (digital audio data after digital compression) of the CD 10, and for instance has a capacity of 16 gigabytes. The HDD 24 can therefore record and reproduce compressed digital audio data from at least 100 CD (compact discs).

Figure 3:
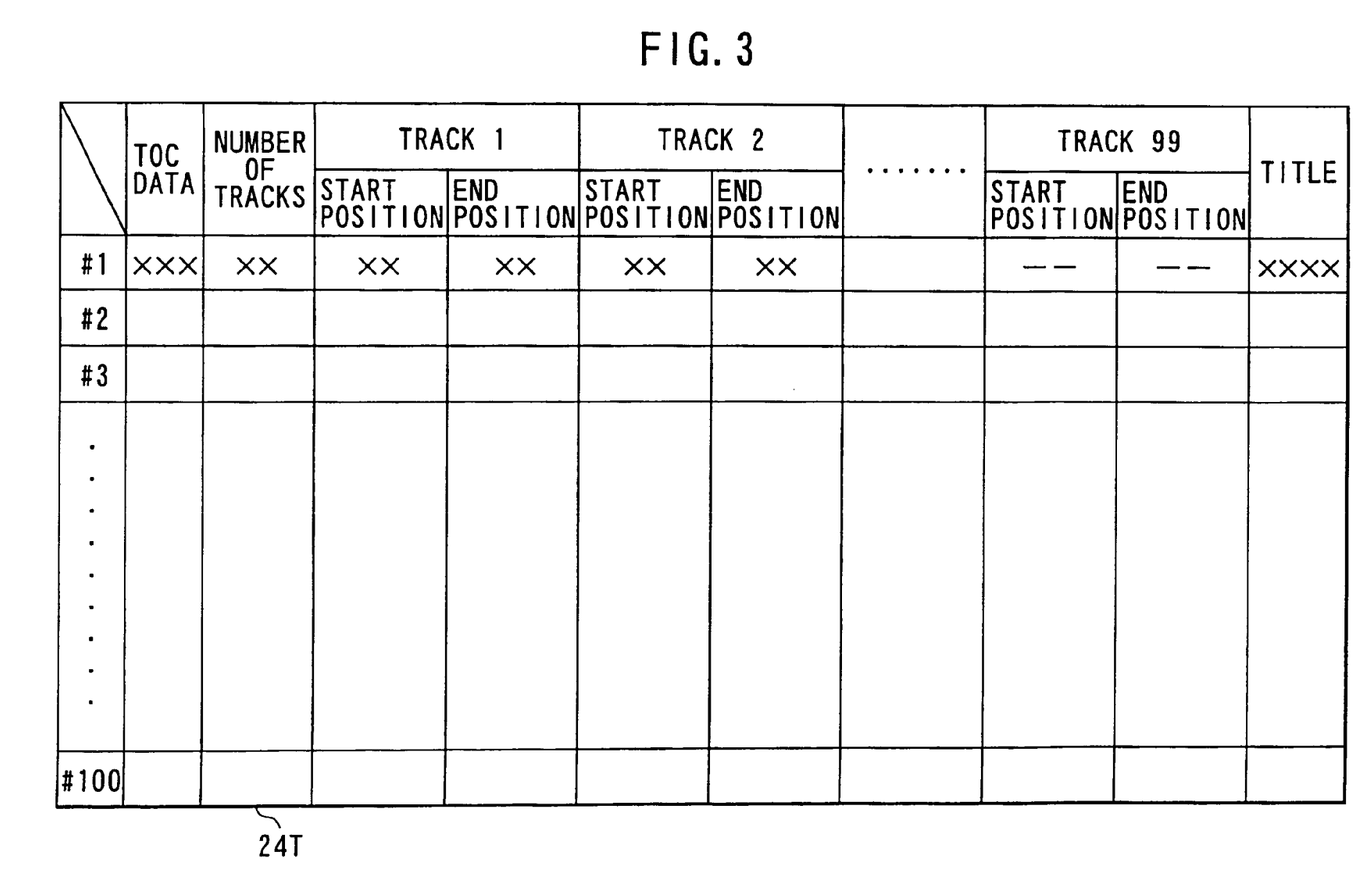
FIG. 3 is a drawing showing the control table of the invention.

At least one control table 24T such as shown in FIG. 3 is provided in the HDD 24. This control table 24T holds information for specifying the write source in FIG. 10 when CD 10 digital audio data was compressed and stored or written in the HDD 24, and also holds the write position (write position per the HDD 24) on each track of the CD 10.

For example 100 data boxes from #1 to #100 are provided in the control table 24T. Each of these data boxes #1 through #100 corresponds to digital audio data for one CD (compact disc) recorded on the HDD 24. These data boxes #1 to #100 are also used as CD Nos. when the contents of a CD copied onto the HDD 24 are selected.

Cells entitled "TOC {Table of Contents} Data", "Number of Tracks", "Track 1 Start Position & End Position", "Track 2 Start Position & End Position" . . . "Final Track Start Position & End Position", and "CD Title" are provided in the respective data boxes (CD Nos.) #1 to #100.

Here, along with the CD 10 containing the time information relating to this track in the TOC, each CD 10 also generally has a different TOC. This TOC data is used as data for searching (retrieving) or for designating a particular CD 10. This TOC data is written as search (retrieval) information in the "TOC data" cell.

All track numbers for the corresponding CD 10 are written in the "Number of Tracks" cell. The respective write start positions and write end positions in the HDD 24 for the respective tracks (tracks in CD 10) are written in the "Track 1 Start Position & End Position" . . . "Final Track Start Position & End Position" cells.

The text (character) data displayed as the title of CD 10 at times such as during reproduction from HDD 24 is written in the "CD Title" cell. For instance, when the CD 10 is a CD of the appropriate standards, the text (character) information recorded in the R through W channels of that lead-in region can be copied and written.

A decoder circuit 25 and an audio output circuit 26 are also connected to the bus line 29. In this case, the decoder circuit 25 is for instance comprised of a DSP, and performs decode processing complementary to the encoder circuit 23 to decode the compressed digital audio data to return it to digital audio data prior to data compression.

The audio output circuit 26 contains a D/A converter circuit. When digital audio data is supplied, the D/A converter circuit converts this digital audio data to analog signals L, R by digital/analog conversion. These audio signals L, R are supplied by way of the output amplifier 27 to the left and right channels of the speakers 28L and 28R.

Along with a buffer memory 31 and a display control circuit 32 connected to the bus line 29, a liquid crystal display (LCD) 33 is for instance connected as a display means to the display control circuit 32 to display various kinds of information.

Figure 2:
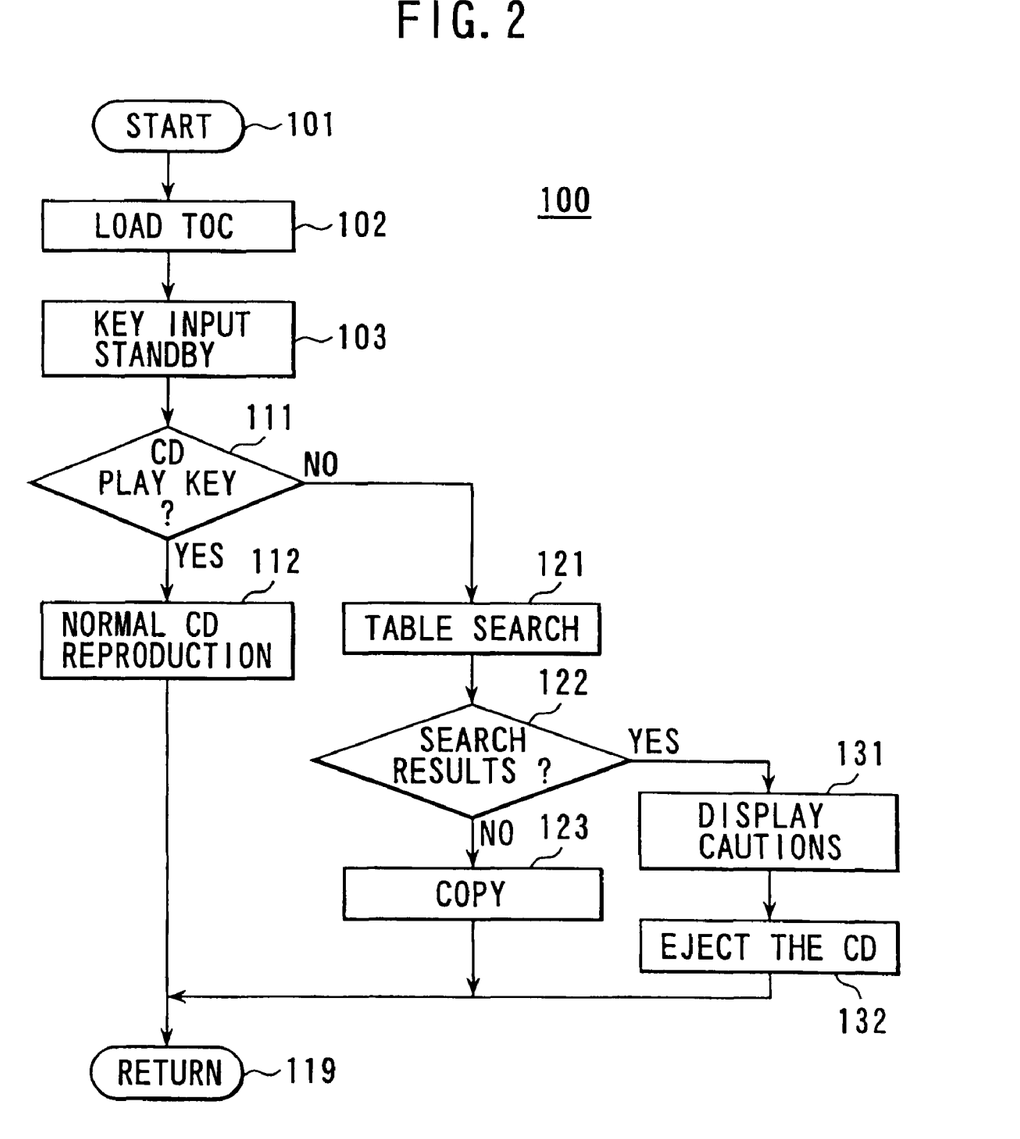
FIG. 2 is a flowchart showing the operation of the invention.

A reference numeral 41 denotes a control circuit to control overall operation of the apparatus. This control circuit 41 is for instance comprised of a microcomputer and is connected to the bus line 29. A routine 100 such as shown for example in FIG. 2 is provided in the control circuit 41 as a portion of the program to run the CPU. Detailed information on this routine 100 is given later on but FIG. 2 only shows an excerpt of the routine 100 relating to this invention.

An operation key 42 comprised of a non-locking type push button switch as the means for user input operation is also connected to the control circuit 41.

In a structure of this type, by executing the routine 100 with the control circuit 41 microcomputer, [Normal CD reproduction] and [Recording from CD to HDD] are implemented as follows.

[Normal CD Reproduction]

This operation is reproducing (playing) the CD 10 just the same as a typical CD player and obtaining an audio output.

In other words, when the CD 10 is set into the CD drive device 21, the control circuit 41 CPU starts the processing from step 101 of routine 100, and next in step 102, the TOC data is read out from the CD 10 by the CD drive device 21. This read out (loaded) TOC data is supplied to and stored in the control circuit 41 from the CD drive device 21 by way of the bus line 29 and then is at key input standby in step 103.

The current case is [Normal CD reproduction] so pressing the reproduction key (play) from among the keys 42, makes the processing precede from step 103 to step 111, and the key input in step 103 is identified.

The reproduction (play) key is pressed in the current case so the processing precedes from step 11 to step 112. In step 112, the normal reproduction processing for the CD 10 is implemented.

In other words, the digital audio data is reproduced (played) from the CD 10 by the CD drive device 21, supplied to the audio output circuit 26 from the CD drive device 21 by way of the bus line 29, and D/A (digital/analog) converted to audio signals L, R. These audio signals L, R are supplied to the speakers 28L and 28R by way of the amplifier 27.

In this case, the track is reproduced (played back) from CD 10 according to the user's instructions and the TOC data stored in the control circuit 41 in step 102 is referred to at this time. Further, information such as the track No. of the track during playback (reproduction) and the elapsed time are displayed on the LCD 33.

Then, when playback of all tracks specified by the user is finished, the process proceeds to step 119 and the routine 100 ends.

The apparatus of FIG. 1 can therefore perform reproduction (playback) of the CD 10 in the same way as a typical CD player.

[Recording from CD to HDD]

This operation is compressing the CD 10 digital audio data and storing or writing this compressed data in the HDD 24.

In other words, when the CD 10 is set in the CD drive 21, the TOC data is loaded (read out) from the CD 10 as previously described and stored in the control circuit 41, and afterwards set to key input standby in step 103.

The current case is [Recording from CD to HDD] so that pressing one of the copy keys 42, makes the operation processing precede from step 103 to step 111, and the key input in step 103 is identified.

When identified in the current case, the copy key was pressed so the processing proceeds from step 111 to step 121. In step 121, the "TOC data" cell of the data in the control table 24T is searched for as the retrieval text for the TOC data loaded (read out) in step 102.

Then, the subsequent processing of retrieval (search) results is performed in other words, in step S122, the search (retrieval) results of step 121 are identified, and when the TOC data loaded in step 102 is not in the "TOC data" cell of control table 24T, the processing then proceeds from step 122 to step 123. In step 123, the CD 10 is copied onto the HDD 24.

In other words, the digital audio data from the CD 10 is reproduced by the CD drive device 21. This digital audio data, along with being written in the memory 22 from the CD drive 21 by way of the bus line 29, is also loaded (read out) from the memory 22 at the specified timing. Then, this read-out digital audio data is supplied to the encoder circuit 23 by way of the bus line 29 and data-compressed by ATRAC processing and the now compressed digital audio data is supplied to the HDD 24 by way of the bus line 29. In this way, the CD 10 digital audio data is written into the HDD 24 while data-compressed.

At this time, the information copied from CD 10 and tracks (tracks in CD 10) is registered in the control table 24T of the HDD 24. In other words, if the copy of CD 10 is the No. nth (n=any of 1 to 100), then the TOC data stored in the control circuit 41 that was loaded from the CD 10 in step 102, is written in the "TOC data" cell of the CD #n box of control table 24T. The number of tracks of CD 10 is also written in the "number of tracks" cell of the CD No. #n box.

Further, the write start position and write end position when the digital audio data of CD 10 is written into HDD 24, are written into the corresponding cell from among the "Track 1 Start Position & End Position" . . . "Final Track Start Position & End Position" cells of the CD #n box.

When the text (character) information for the CD 10 and tracks is input from the keys 42, that character data is stored in the memory 31, and when copying of the CD 10 is complete, that text information that was loaded from the memory 31, is written in the "Title" cell of the CD #n box of the control table 24T. When the CD 10 data has CD text, that text (character) information added to CD 10 is also written.

In this way, when the contents of the CD 10 are written into HDD 24, the corresponding portion of the control table 24T is also rewritten.

When the above processing is complete, the processing proceeds from step 123 to step 119, and routine 100 ends.

Therefore, when a CD 10 is not yet copied onto the HDD 24, information specifying that CD 10 is registered in the control table 24T along with the copied contents of that CD 10.

Figure 4:
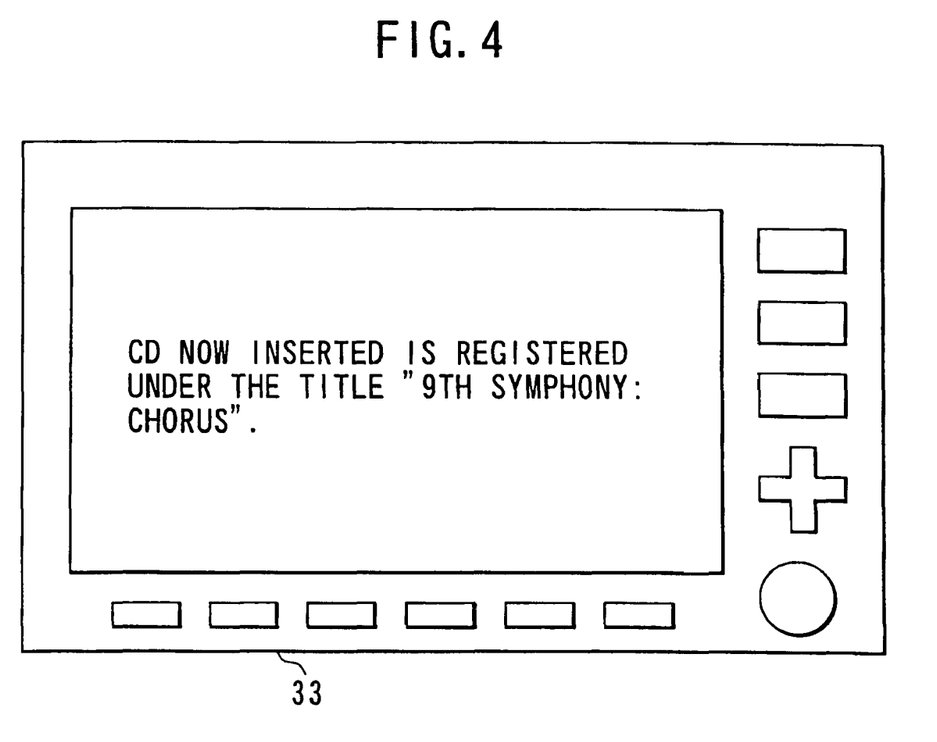
FIG. 4 is a drawing showing a typical display of the invention.

In step 122 on the other hand, when the TOC data read out in step 102 is in the "TOC Data" cell of the control table 24, the processing proceeds from step 122 to step 131. In step 131, the specified data is supplied from the control circuit 41 by way of the bus line 29 to the display control circuit 32. As a result, as shown for instance in FIG. 4, a string of characters constituting a caution sentence is displayed to show that the CD 10 whose copy is being attempted, has already been copied onto the HDD 24.

Next, the processing proceeds to step 132 and the CD 10 is ejected from the CD drive device 21 in compliance with instructions from the control circuit 41. This routine then ends in step 119.

[Reproducing from HDD]

In this operation, the contents of the CD copied onto the HDD 24 are played back (reproduced). The processing routine for this playback is not shown in the drawings.

In other words, when playback from the HDD 24 is commanded by way of the keys 42, the data from the "Title Cell" cell of the data boxes registered from among the data boxes #1 to #100 of the control table 24T is read out. This data and the data for the matching CD #n are supplied to the display control circuit 32. Consequently, the CD #n and corresponding display with the "Title" are displayed in the LCD 33.

When the keys 42 are operated and the desired CD #m then input, the data written into the cells from among the "Number of Tracks" through "Title" cells of the control table 24T boxes is read out, and stored in the control circuit 41.

Next, by using the data stored in this control circuit 41 in the same way as the TOC data written on the CD, the digital audio data corresponding to the CD #m in the CD contents, are loaded from HDD 24 and output as audio.

In this case, the digital audio data, when loaded from the HDD 24, is supplied to the decoder circuit 25 and expanded to the original audio data after being buffered by the memory 22. This now expanded digital audio data is then supplied to the audio output circuit 26. The playback (or reproduction) audio from the digital audio data loaded from the HDD 24 is therefore output from the speakers 28L and 28R.

Information such as the track No. and elapsed time of the track (CD track) being played back is displayed on the LCD 33 even during playback (reproduction) from the HDD 24.

SUMMARY

Thus, in the reproduction device of FIG. 1, when the contents of the CD 10 are copied onto the HDD 24, a check can be made to find whether or not all of that CD 10 was copied, by referring to the control table 24T, and copy implemented only when the content were found not to have been copied. Therefore, by preventing the same CD from being copied twice, the useless expenditure of the memory capacity for instance of the HDD 24 can be prevented.

Furthermore, monitoring by the user is not required for checking whether or not a CD was copied onto the HDD 24 and duplicate copying is automatically prevented.

Also, when not known whether copy of a particular CD onto the HDD 24 is finished, that CD can be inserted into the CD drive device 21 and the copy key operated. If not previously copied, a copy of that CD is then made onto the HDD 24, however if copying has already been completed, then a message showing copy was already completed is displayed and duplicate copying is not implemented.

Consequently, the above processing requires no special hardware and is accomplished just by providing the control table 24T in the HDD 24.

Furthermore, desired text information can be written into the "Title" cell of the control table 24T so that information such as a special title can be attached to that copy when the CD is copied onto the HDD 24.

[Others]

Figure 5:
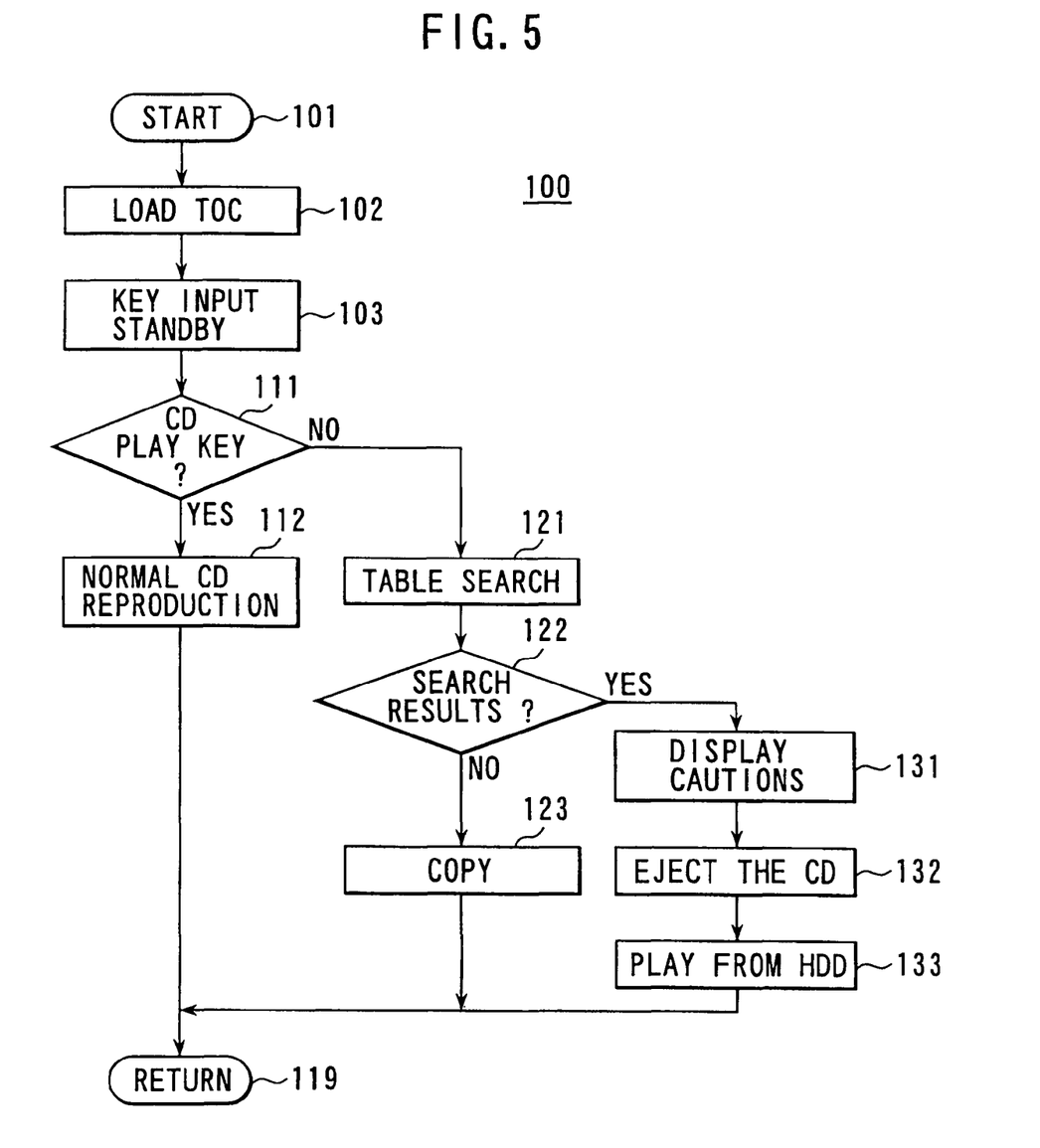
FIG. 5 is a flowchart showing another embodiment of the invention.

In one case in the routine 100 of FIG. 5, when the CD 10 has previously been copied onto the HDD 24, the process proceeds after step 132 to step 133, and the contents of the CD 10 whose copy onto the HDD 24 was attempted are reproduced (played back) from the HDD 24.

Therefore, in this case, when the copying of a CD already copied onto the HDD 24 is again attempted, not only is a caution display issued on the LCD 33, but a check can also be made by playing back the audio.

The information written in the "Title" cell of the control table 24T as described above, can also be collected and written at some other time after copying onto the HDD 24 and in such cases, after copy of the CD contents is complete, information such as the date and time the copy was made can also be written by default.

Information written into the "Title" cell can be written into a nonvolatile memory. The CD 10 can also be reproduced (played) and when those contents are copied into the HDD 24, the reproduction speed can be a higher speed than the standard speed. The control table 24T may be made to show the corresponding relation of the TOC data with the digital audio data written in the HDD 24.

The invention as described above, renders the effect that mistaken copying of the same CD twice is prevented and that the wasted expenditure of memory capacity for instance of the HDD is eliminated. Further, whether a CD has been copied or not onto the HDD can be known without requiring any monitoring by the user and double copying of the CD can automatically be prevented.

This invention renders the further effect that, when not known whether copy of a particular CD is finished or not, the copy of that CD can be attempted, and if not previously copied, then copying of that CD is then executed. However, if the CD was previously copied, then duplicate (two-time) copying of the CD is prevented. Furthermore, the above process is accomplished just by providing a control table in the HDD and no special hardware is required.

What is claimed is:

1. A digital audio data recording device comprising:
   reading means for reading digital audio data and a TOC from a CD;
   recording means for recording, on a HDD, the digital audio data and the TOC, and for recording control data generated from the TOC in a control table managing control data generated from a TOC of an already recorded CD on the HDD; and control means for controlling, when recording the digital audio data to be recorded on the HDD by the recording means, permission/prohibition of recording on the HDD of the digital audio data, based on the control data to be generated from the TOC and the control data which is generated from the TOC of the already recorded CD and which is recorded in the control table, the control means prohibiting recording of the digital audio data on the HDD when the control data generated from the TOC is already recorded in the control table on the HDD, wherein, in a case recording of digital audio data of a specific CD is permitted, the control means performs control to update the control table based on the control data generated from a TOC of the specific CD.

2. The digital audio data recording device according to claim 1, wherein, in a case the control data generated from the TOC is recorded in the control table, the control means prohibits recording, by the recording means, of the digital audio data to be recorded.

3. The digital audio data recording device according to claim 1, wherein, in a case the control data generated from the TOC is recorded in the control table, the control means issues an alert that the digital audio data to be recorded is already recorded by the recording means.

4. The digital audio data recording device according to claim 3, wherein the control means issues an alert that the CD is already recorded by displaying, on display means, information including a title of the CD.

5. The digital audio data recording device according to claim 1, wherein, in a case the control data generated from the TOC is not recorded in the control table, the control means permits recording, by the recording means, of the digital audio data to be recorded.

6. The digital audio data recording device according to claim 1, further comprising:
compression means for compressing the digital audio data, wherein, when recording the digital audio data to be recorded by the recording means, the digital audio data to be recorded by the recording means is compressed by the compression means and digital audio data that is a result of compression is recorded.

7. The digital audio data recording device according to claim 1, wherein the control table includes at least one of the number of tracks, a starting position of a track, an end position of a track, and a title of a CD.

8. The digital audio data recording device according to claim 1, wherein, in a case the control data generated from the TOC is recorded in the control management table, the control means ejects the CD.

9. The digital audio data recording device according to claim 1, wherein, in a case the control data generated from the TOC is recorded in the control table, the control means reproduces, from the HDD, the digital audio data which was intended to be recorded.

10. A digital audio data recording method comprising the steps of:
reading digital audio data and a TOC from a CD;
recording, on a HDD, the digital audio data and the TOC;
generating control data based on the TOC;
searching, by the generated control data, through a control table managing control data generated from a TOC of an already recorded CD on the HDD;
controlling, based on a search result, permission/prohibition of recording of the digital audio data on the HDD, said controlling including prohibiting recording of the digital audio data on the HDD when the control data generated from the TOC is already recorded in the control table on the HDD; and
updating the control table in a case recording of digital audio data from a specific CD is permitted, based on the control data generated from a TOC of the specific CD.

11. The digital audio data recording method according to claim 10, further comprising:
prohibiting, in a case the search result indicates that the generated control data is recorded in the control table, recording of the digital audio data on the HDD.

12. The recording method according to claim 10, further comprising:
issuing, in a case the search result indicates that the generated control data is recorded in the control table, an alert that the digital audio data is already recorded on the HDD.

13. The digital audio data recording method according to claim 10, further comprising:
permitting, in a case the search result indicates that the generated control data is not recorded in the control table, recording of the digital audio data on the HDD.

14. The digital audio data recording method according to claim 10, further comprising:
ejecting the CD in a case the control data generated from the TOC is recorded in the control table.

15. A digital audio data recording device comprising:
a reading unit configured to read digital audio data and a TOC from a CD;
a recorder configured to record, on a HDD, the digital audio data and the TOC, and to record control data generated from the TOC in a control table managing control data generated from a TOC of an already recorded CD on the HDD; and
a controller, including a processor, configured to control, when recording the digital audio data to be recorded on the HDD by the recorder, permission/prohibition of recording of the digital audio data, based on the control data to be generated from the TOC and the control data which is generated from the TOC of the already recorded CD and which is recorded in the control table, the controller prohibiting recording of the digital audio data on the HDD when the data generated from the TOC is already recorded in the control table on the HDD, wherein, in a case recording of digital audio data of a specific CD is permitted, the controller performs control to update the control table based on the control data generated from a TOC of the specific CD.

16. The digital audio data recording device according to claim 15, wherein, in a case the control data generated from the TOC is recorded in the control table, the controller prohibits recording, by the recorder, of the digital audio data to be recorded.

17. The digital audio data recording device according to claim 15, wherein, in a case the control data generated from the TOC is recorded in the control table, the controller issues an alert that the digital audio data to be recorded is already recorded by the recorder.

18. The digital audio data recording device according to claim 17, wherein the controller issues an alert that the CD is already recorded by displaying, on a display, information including a title of the CD.

19. The digital audio data recording device according to claim 15, wherein, in a case the control data generated from the TOC is not recorded in the control table, the controller permits recording, by the recorder, of the digital audio data to be recorded.

20. The digital audio data recording device according to claim 15, further comprising:
a compressor configured to compress the digital audio data, wherein, when recording the digital audio data to be recorded by the recorder, the digital audio data to be recorded by the recorder is compressed by the compressor and digital audio data that is a result of compression is recorded.

21. The digital audio data recording device according to claim 15, wherein the control table includes at least one of the number of tracks, a starting position of a track, an end position of a track, and a title of a CD.

22. The digital audio data recording device according to claim 15, wherein, in a case the control data generated from the TOC is recorded in the control management table, the controller ejects the CD.

* * * * *